United States Patent [19]
Talaat et al.

[11] Patent Number: 6,115,364
[45] Date of Patent: Sep. 5, 2000

[54] DISTRIBUTED PORT SELECT METHOD FOR A MULTI-SEGMENT REPEATER

[75] Inventors: M. Magdy Talaat, Mountain View; S. Babar Raza, Santa Clara, both of Calif.

[73] Assignee: Cypress Semiconductor Corp., San Jose, Calif.

[21] Appl. No.: 08/976,410

[22] Filed: Nov. 21, 1997

[51] Int. Cl.$^7$ .................................................. H04L 12/66
[52] U.S. Cl. ........................... 370/293; 370/463; 370/501
[58] Field of Search ..................................... 370/401, 422, 370/423, 434, 438, 439, 492, 293, 463, 465, 498, 501

[56] References Cited

U.S. PATENT DOCUMENTS

| | | | |
|---|---|---|---|
| 5,757,795 | 5/1998 | Schnell | 370/392 |
| 5,953,340 | 9/1999 | Scott et al. | 370/401 |
| 6,055,241 | 4/2000 | Raza et al. | 370/445 |

*Primary Examiner*—Ricky Ngo
*Attorney, Agent, or Firm*—Christopher P. Maiorana, P.C.

[57] ABSTRACT

A circuit and method comprising a physical layer circuit, a select circuit and a repeater circuit. The physical layer circuit may be configured to present a number of shared signals and a number of individual signals. The select circuit may be configured to connect one or more said first number of shared signals to one of a second number of shared signals, where the second number of shared signals may be less than the first number of shared signals. The repeater circuit may be configured to receive the number of individual signals and the second number of shared signals.

16 Claims, 5 Drawing Sheets

DISTRIBUTED PORT SELECT METHOD FOR A MULTI-SEGMENT REPEATER

FIELD OF THE INVENTION

The present invention relates to computer networks generally and, more particularly, to a distributed port select circuit and method in a multi-segment repeater hub.

BACKGROUND OF THE INVENTION

Computer networks allow the connectivity of a number of nodes through a physical network layer. The physical layer is generally connected through repeaters, often configured in a hub. Media Independent Interface (MII) lines are generally connected from each Physical Layer Device (PHY) that must be connected to the repeater in order to connect the ports to the appropriate repeater segments. The MII lines must generally be connected between the appropriate repeaters and each of the physical layer devices. A disadvantage with such an approach is that it limits the number of ports that can be connected to a repeaters due to an increased number of pins.

Another implementation may include integrating the physical layer devices with a repeater in a single device. A disadvantage with such an approach is that it limits the operation of the repeater to one specific type of physical layer device.

SUMMARY OF THE INVENTION

The present invention concerns a circuit and method comprising a physical layer circuit, a select circuit and a repeater circuit. The physical layer circuit may be configured to present a number of shared signals and a number of individual signals. The select circuit may be configured to connect one or more of the first number of shared signals to one of a second number of shared signals, where the second number of shared signals may be less than the first number of shared signals. The repeater circuit may be configured to receive the number of individual signals and the second number of shared signals.

The objects, features and advantages of the present invention include providing a circuit and method for distributing shared signals in a multi-segment repeater that may reduce the number of pins required between a number of physical layer devices and a number of segments where the number of physical layer devices is greater than the number of segments.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

The present invention concerns a circuit and method for connecting PHY devices to a repeater (e.g., multi-segment repeater). A MII interface between the PHY devices and the network segments of the multi-segment repeater may be divided into a group of signals that are individually connected to the repeater and a group of signals that are shared. The shared group of signals may be connected to a segment select block that contains logic to connect the shared signals of one or more PHY devices to the shared bus of any one of the repeater segments. In one embodiment, the select logic may control the connection of the shared signals to a repeater segment through a serial interface in the segment select block. A PHY select block may connect the individual signals from the PHY to one of the repeater segments.

Figure 1:
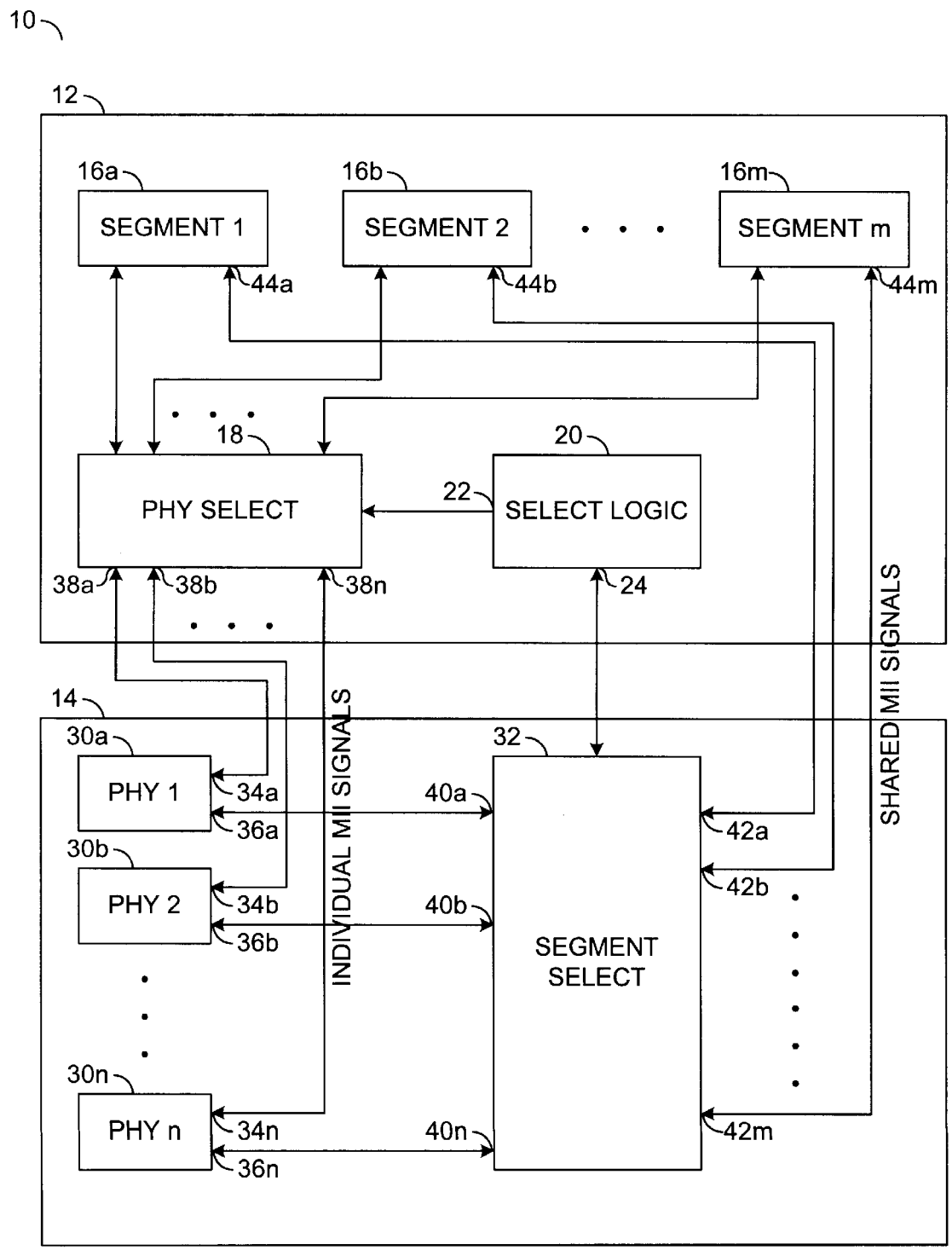
FIG. 1 is a block diagram of a preferred embodiment of the present invention.

Referring to FIG. 1, a block diagram of a circuit 10 is shown in accordance with a preferred embodiment of the present invention. The circuit 10 generally comprises a repeater section (or circuit) 12 and a physical layer section (or circuit) 14. The repeater section 12 generally comprises a number of segments 16a–16m, a PHY select block 18 and a select logic block 20. An example of the repeater section 12 and the PHY select block 18 may be found in co-pending application U.S. Ser. No. 08/970,059 filed Nov. 13, 1997, which is hereby incorporated by reference in its entirety. Additional connections (e.g., the link connections) are described in more detail in co-pending application U.S. Ser. No. 08/966,938, filed Nov. 10, 1997, which is hereby incorporated by reference in its entirety. The select logic block 20 may include an output 22 that may present a control signal to the PHY select block 18. The select logic block 20 may also include an output 24 that may present a control signal to the segment select block 32.

The physical layer section 14 generally comprises a number of physical layer devices 30a–30n and a segment select block (or circuit) 32. Each of the physical layer devices 30a–30n generally comprises a number of inputs/outputs 34a–34n and a number of inputs/outputs 36a–36n that may be coupled as pairs. The inputs/outputs 34a–34n may be coupled to a number of inputs/outputs 38a–38n of the PHY select block 18. The inputs/outputs 36a–36n may be coupled to a number of inputs/outputs 40a–40n of the segment select block 32. The segment select block 32 also has a number of inputs/outputs 42a–42m that may be coupled to a number of inputs/outputs 44a–44m of the particular segments 16a–16m, respectively. The number of outputs 42a–42m generally corresponds to the number of segments 16a–16m. The number of inputs/outputs 40a–40n of the segment select block 32 may correspond to a first number (or set) of shared signals. The outputs 42a–42m of the segments select block 32 may correspond to a second number (or set) of shared signals. One or more of the first set of shared signals may be coupled to one of the second set of shared signals. As a result, a greater number of physical layer devices 30a–30n may be coupled to a smaller number of segments 16a–16m. By routing the shared signals through the segment select block 32 via the inputs/outputs 36a–36n and then to the inputs 44a–44m of the segments 16a–16m, the overall number of pins (or connections) between the physical layer section 14 and the repeater section 10 may be reduced.

Figure 2:
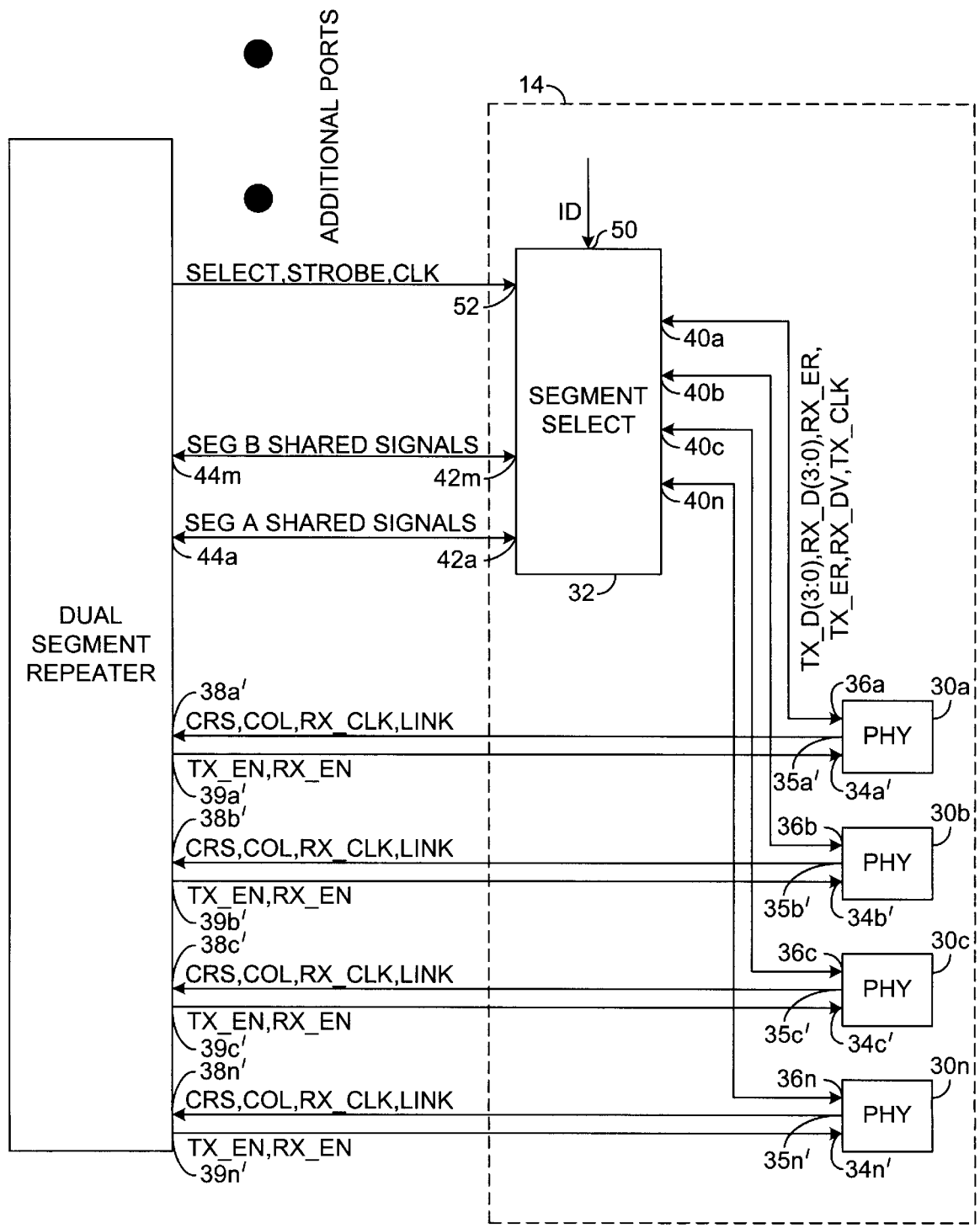
FIG. 2 is a block diagram of an embodiment of the present invention illustrating four physical layer devices and two network segments.

Referring to FIG. 2, an example of the present invention is shown where the number of physical layer devices 30a–30n implemented is four (e.g., n=4) and the number of segments 16a–16m implemented is two (e.g., m=2). The inputs/outputs 34a–34n are shown implemented as inputs 34a'–34n' and outputs 35a'–35n'. Similarly, the inputs 38a–38n are shown implemented as inputs 38a'–38n' and outputs 39a'–39n'. The signals received at the inputs 38a'–38n' generally include the individual signals from the physical layer devices 30a–30n. The individual signals may include a signal CRS, a signal COL, a signal $RX_{13}$ CLK, and a signal LINK. The signal CRS, the signal COL and the signal RX_CLK may be standard MII signals, while the signal LINK may be a non-MII signal. The signals presented at the outputs 39a'–39n' may include a transmit enable signal (e.g., TX_EN) and a receive enable signal (e.g., RX_EN). The shared signals are generally coupled between the physical layer devices 30a–30n and the inputs/outputs 40a–40n of the segment select block 32. The shared signals may include the following standard MII signals: a transmit data signal (e.g., TX_D(3:0)), a receive data signal (e.g., RX_D(3:0)), a receive error signal (e.g., RX_ER), a transmit error signal (e.g., TX_ER), a receive data valid signal (e.g., RX_DV) and a transmit clock signal (e.g., TX_CLK). A more detailed description of the various shared signals may be found in the IEEE 802.3 MII standard, the relevant sections which are hereby incorporated by reference. The segment select block 32 may include an input 50 that may receive a select signal from the output 24 of the select logic block 20. The segment select block 32 also has an input 52 that may receive a clock signal from the repeater section 12. Since the shared signals are transmitted between the physical layer section 14 and the repeater section 12, the overall number of connections (or pins) between the two sections may be minimized. The segment select block 32 may be implemented as part of the physical layer section 14 or as an independent device.

Figure 3:
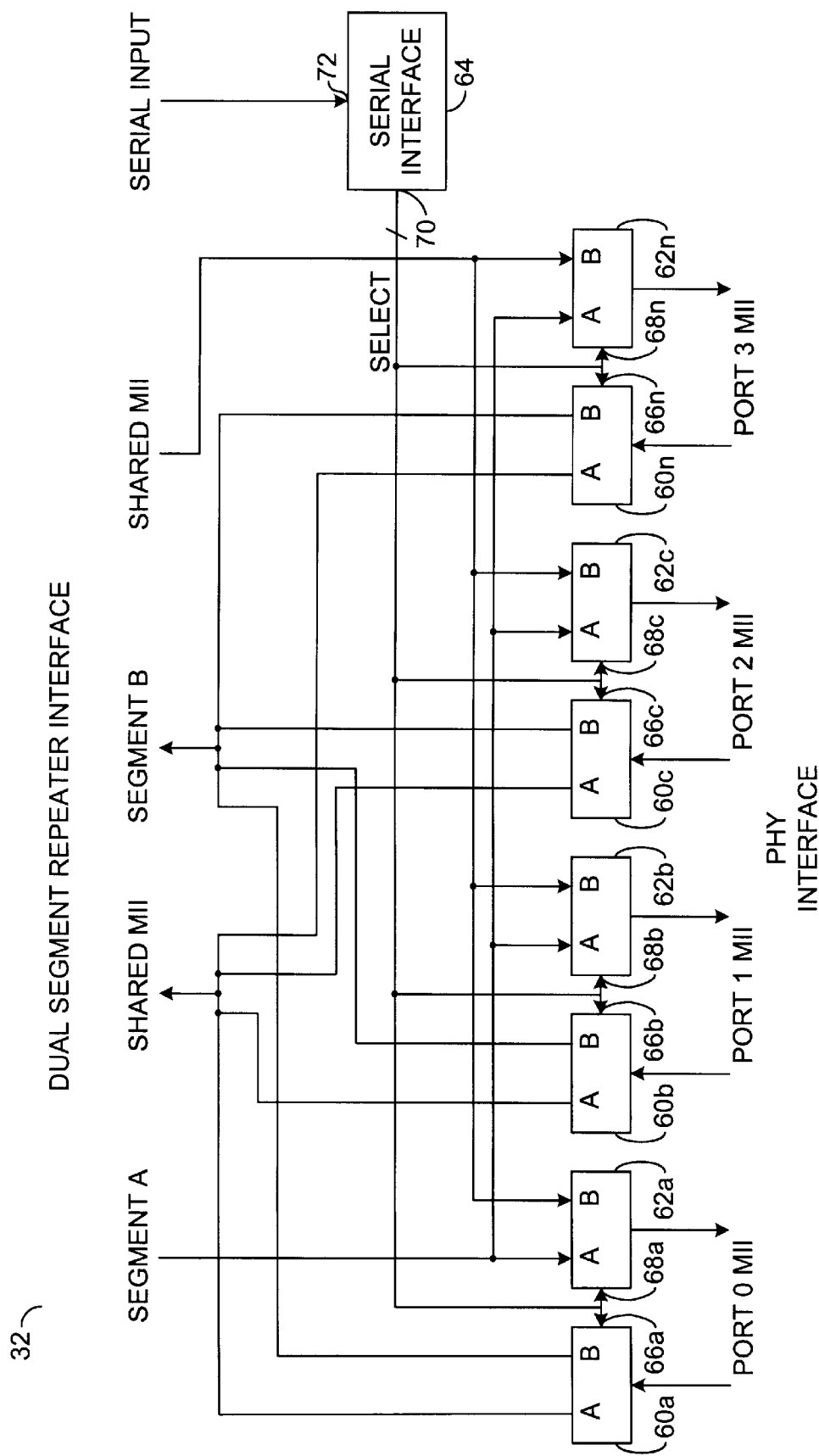
FIG. 3 is a block diagram of the segment select block of FIG. 2.

Referring to FIG. 3, a more detailed block diagram of the segment select block 32 is shown. The segment select block 32 generally comprises a number of input pass gates 60a–60n, a number of output pass gates 62a–62n and a serial interface block 64. The serial interface block 64 generally receives a serial input and presents a parallel output. The input pass gates 60a–60n and the output pass gates 62a–62n generally operate as pass gate pairs (e.g., pass gates 60a and 62a may be considered a pair). The input pass gates 60a–60n generally present information from the physical devices 30a–30n to the repeater section 12. The output pass gates 62a–62n generally receive information from the repeater section 12. Each of the pass gate pairs (e.g., 60a and 62a) generally have inputs 66a and 68a that may receive a signal (e.g., a select signal) from a multi-bit output 70 of the serial interface block 64. As a result, the pass gate pairs 60a and 62a generally turn on in response to a single select signal received from the multi-bit output 70 of the serial interface block 64. The other pass gate pairs (e.g., 60b and 62b, 60c and 62c, and 60d and 62d) generally have similar operations. The serial interface 64 also has an input 72 that receives a serial input signal from the select logic 24.

The input signals received from the physical layer section 14 may be presented and/or received to/from the individual segments 16a–16m through the input pass gates the 60a–60n and the output pass gates 62a–62n. The select signal generally determines which set of physical layer devices 30a–30n will be connected to any of the segments 16a–16m at a given time. The serial interface block 64 generally extracts the select signal from the serial data stream received at the input 72.

Figure 4:
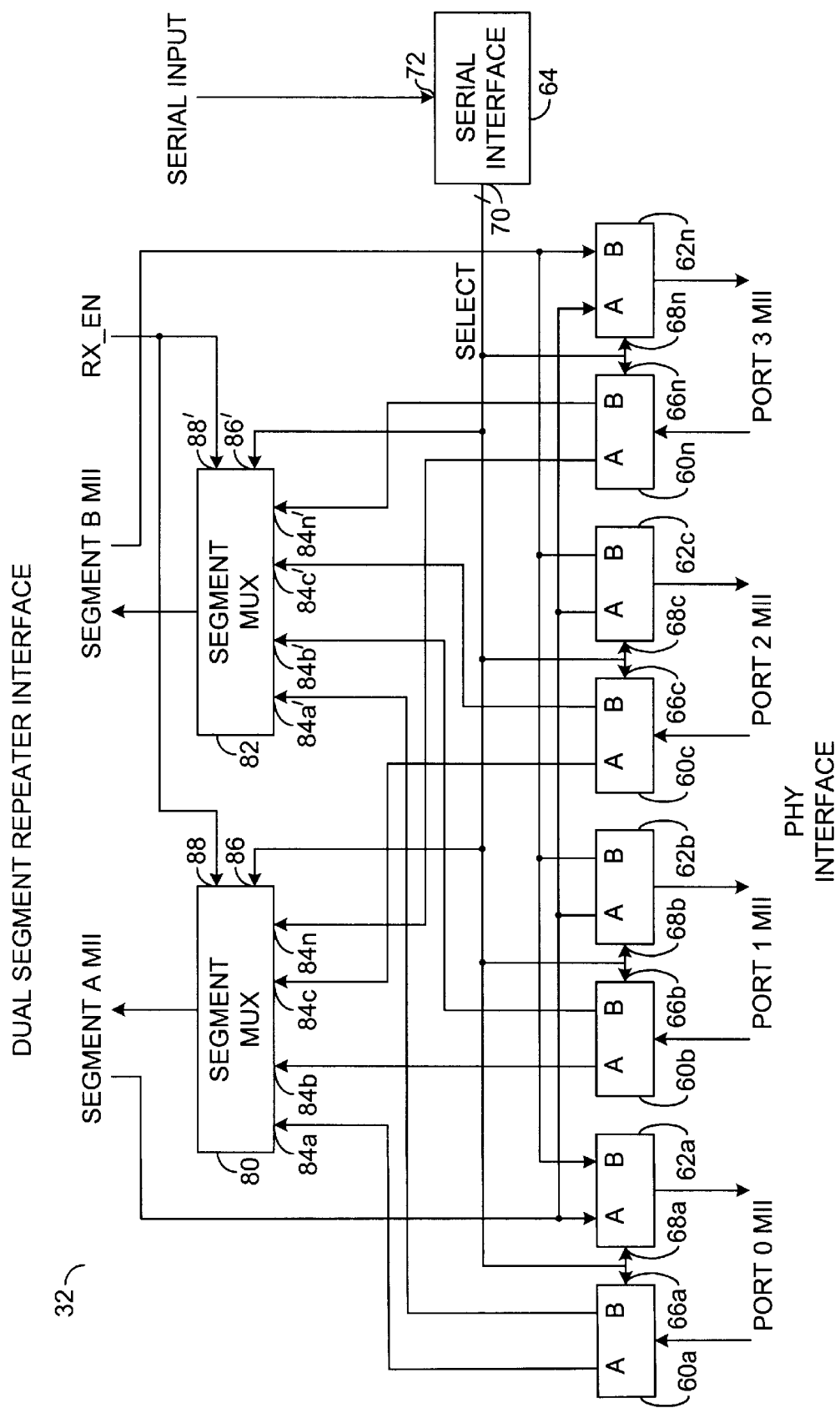
FIG. 4 is an alternate implementation of the segment select logic of FIG. 2.

Referring to FIG. 4, an alternate embodiment of the select block 32 is shown implementing a segment multiplexor 80 and a segment multiplexor 82. The segment multiplexor 80 is shown receiving the output signals from the input pass gates 60a–60n at a number of inputs 84a–84n and the select signal from the multi-bit output 70 of the serial interface block 64 at an input 86. Additionally, the segment multiplexor 80 comprises an input 88 that may receive a receive enable signal (e.g., RX_EN). The multiplexor 82 has similar inputs labeled 84a'–84n', 86' and 88'. As a result, the multiplexors 80 and 82 provide an enabled input to the repeater section 12.

Figure 5:
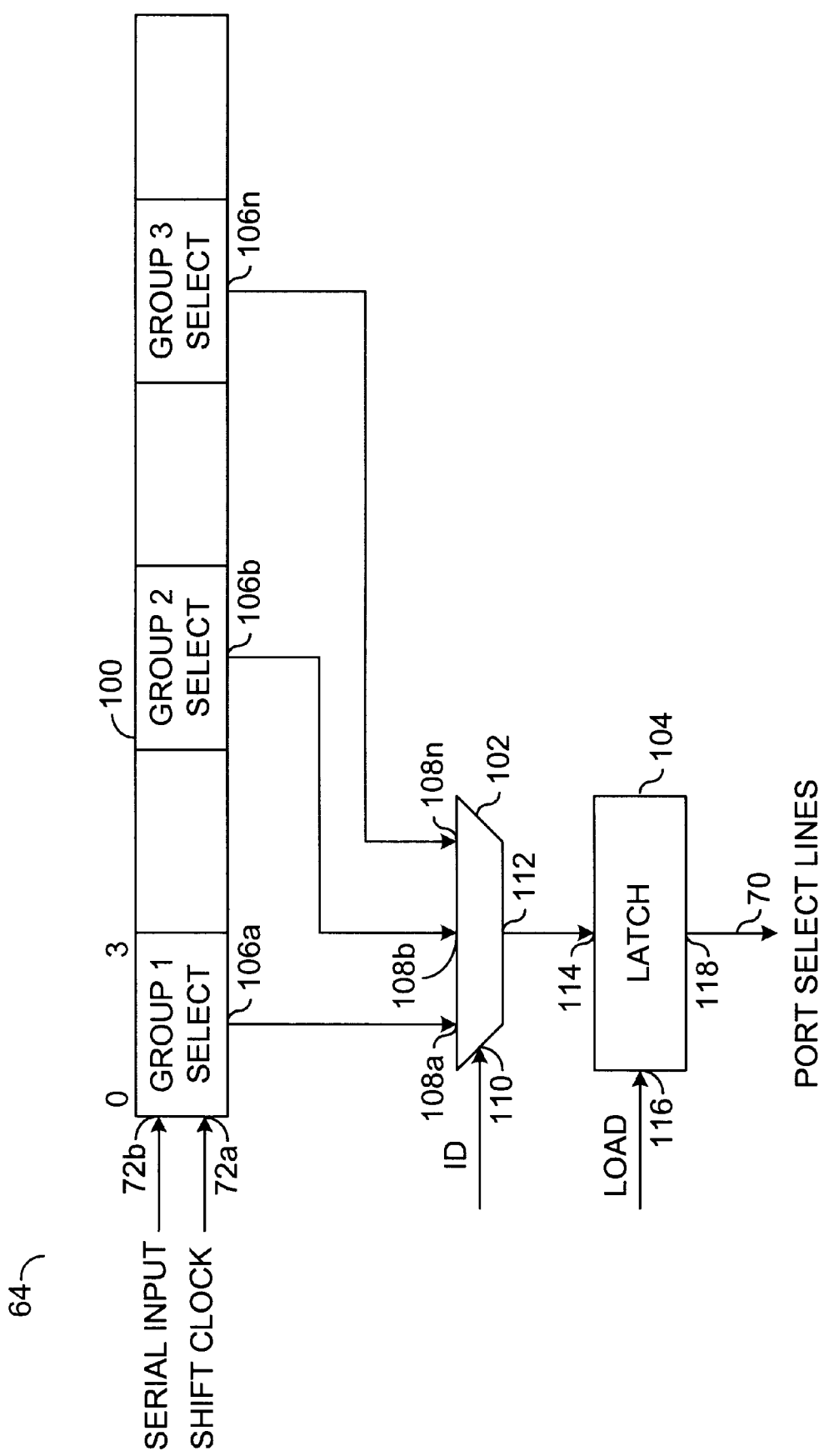
FIG. 5 is an implementation of the serial interface block of FIG. 4.

Referring to FIG. 5, a more detailed diagram of the serial interface 64 is shown. The serial interface 64 generally comprises an input 72a and an input 72b that may receive a shift clock signal and a serial input signal, respectively. The serial interface 64 additionally comprises a shift register 100, a multiplexor 102 and a latch 104. The shift register 100 generally receives the signals at the inputs 72a and 72b and may present signals at a number of outputs 106a–106n. The signals presented at the outputs 106a–106n are generally received at a number of inputs 108a–108n. The multiplexor 102 may also include an input 110 that may receive a control signal (e.g., a signal ID). The multiplexor 102 may present a signal at an output 112 that may be received at an input 114 of the latch 104. The latch 104 may also comprise an input 116 that may receive a control signal (e.g., load). The latch 104 generally has an output 118 that presents the select signal at the output 70. The shift register 100 is generally clocked by the shift clock signal received at the input 72. The signal ID generally controls the multiplexor 102 which may determine which group of bits are extracted and presented as the select signal.

The circuit 10 may allow a greater number of physical layer devices 30a–30n to be connected to the repeater section 12 while using a minimum number of pins. The following TABLE 1 illustrates an example of pin savings with the use of the circuit 10. The example shown may apply to a dual segment repeater:

TABLE 1

| Number of PHY's | Pins Without Select Logic | Pins With Select Logic |
|---|---|---|
| 8 | 136 | 72 |
| 12 | 204 | 96 |
| 16 | 272 | 120 |

While the invention has been particularly shown and described with reference to the preferred embodiments thereof, it will be understood by those skilled in the art that various changes in form and details may be made without departing from the spirit and scope of the invention.

What is claimed is:

1. A circuit comprising:
   a physical layer circuit configured to present a first number of shared signals and a number of individual signals;
   a select circuit configured to connect one or more of said first number of shared signals to one of a second number of shared signals, wherein said second number of shared signals is less than the first number of shared signals; and
   a repeater circuit configured to receive said number of individual signals and said second number of shared signals.

2. The circuit according to claim 1, wherein said select circuit is configured to connect one or more of said first number of shared signals to one of said second number of shared signals in response to a control signal.

3. The circuit according to claim 1, further comprising:
   a logic circuit configured to present said control signal.

4. The circuit according to claim 1, wherein said select circuit comprises:

a serial interface circuit configured to present a select signal; and a plurality of pass gates configured to connect said one or more of said first number of shared signals with said one of said second number of shared signals in response to said select signal.

5. The circuit according to claim 4, wherein said pass gates are configured as pass gate pairs.

6. The circuit according to claim 5, further comprising two or more segment multiplexors configured to present said second number of shared signals.

7. The circuit according to claim 1, wherein said first number of shared signals and said second number of shared signals comprise media independent interface (MII) signals.

8. The circuit according to claim 1, wherein each of said number of individual signals is selected from a group consisting of: a signal CRS, a signal COL, a signal RX_CLK and a signal LINK.

9. The circuit according to claim 1, wherein each of said first number of shared signals is selected from a group consisting of: a transmit data signal, a receive data signal, a receive error signal, a transmit error signal, a receive data valid signal and a transmit clock signal.

10. The circuit according to claim 1, wherein each of said second number of shared signals is selected from a group consisting of: a transmit data signal, a receive data signal, a receive error signal, a transmit error signal, a receive data valid signal and a transmit clock signal.

11. A circuit comprising:

means for generating a first number of shared signals and a number of individual signals;

means for connecting one or more of said first number of shared signals to one of a second number of shared signals, wherein the second number of shared signals is less than the first number of shared signals; and means for receiving said number of individual signals and said second number of shared signals.

12. The circuit according to claim 11, wherein said means for connecting one or more of said first number of shared signals to one of said second number of shared signals responds to a control signal.

13. The circuit according to claim 11, wherein said means for connecting one or more of said first number of shared signals to one of said second number of shared signals comprises:

means for generating a select signal; and means for connecting one or more of said first number of shared signals with one of said second number of shared signals in response to said select signal.

14. A method for connecting a physical layer circuit to a repeater circuit comprising the steps of:

(a) generating a first number of shared signals and a number of individual signals from said physical layer circuit;

(b) connecting one or more of a second number of shared signals to said first number of shared signals, wherein the second number of shared signals is less than the first number of shared signals; and (c) receiving said number of individual signals and said second number of shared signals by said repeater circuit.

15. The method according to claim 14, wherein step (b) further comprises connecting one or more of said first number of shared signals to one of said second number of shared signals in further response to a control signal.

16. The method according to claim 14, further comprising the steps of:

(d) generating a select signal; and (e) connecting one or more of said first number of shared signals with one of said second number of shared signals in response to said select signal.

* * * * *